(No Model.) 2 Sheets—Sheet 1.

T. E. FOUDRAY.
GATE.

No. 489,604. Patented Jan. 10, 1893.

Witnesses
J. Ulte Jr.
H. J. Riley

Inventor
T. E. Foudray.
By his Attorneys,
C. A. Snow & Co.

THE NORRIS PETERS CO., PHOTO-LITHO., WASHINGTON, D. C.

(No Model.) 2 Sheets—Sheet 2.

T. E. FOUDRAY.
GATE.

No. 489,604. Patented Jan. 10, 1893.

Witnesses
J. Ulke Jr.
H. T. Riley

Inventor
T. E. Foudray.
By his Attorneys,
C. A. Snow & Co.

UNITED STATES PATENT OFFICE.

THOMAS E. FOUDRAY, OF SEDALIA, MISSOURI.

GATE.

SPECIFICATION forming part of Letters Patent No. 489,604, dated January 10, 1893.

Application filed March 17, 1892. Serial No. 425,288. (No model.)

*To all whom it may concern:*

Be it known that I, THOMAS E. FOUDRAY, a citizen of the United States, residing at Sedalia, in the county of Pettis and State of Missouri, have invented a new and useful Gate, of which the following is a specification.

The invention relates to improvements in swinging gates.

The object of the present invention is to simplify and improve the construction of swinging gates, and to enable the same to be readily operated at a distance therefrom on either side of them to obviate the necessity of leaving a vehicle.

A further object of the invention is to provide means whereby a gate may be adjusted to counteract sagging, to pass freely over snow drifts, and to be elevated for the separation of animals.

The invention consists in the construction and novel combination and arrangement of parts hereinafter fully described, illustrated in the accompanying drawings and pointed out in the claim hereto appended.

Figure 1:
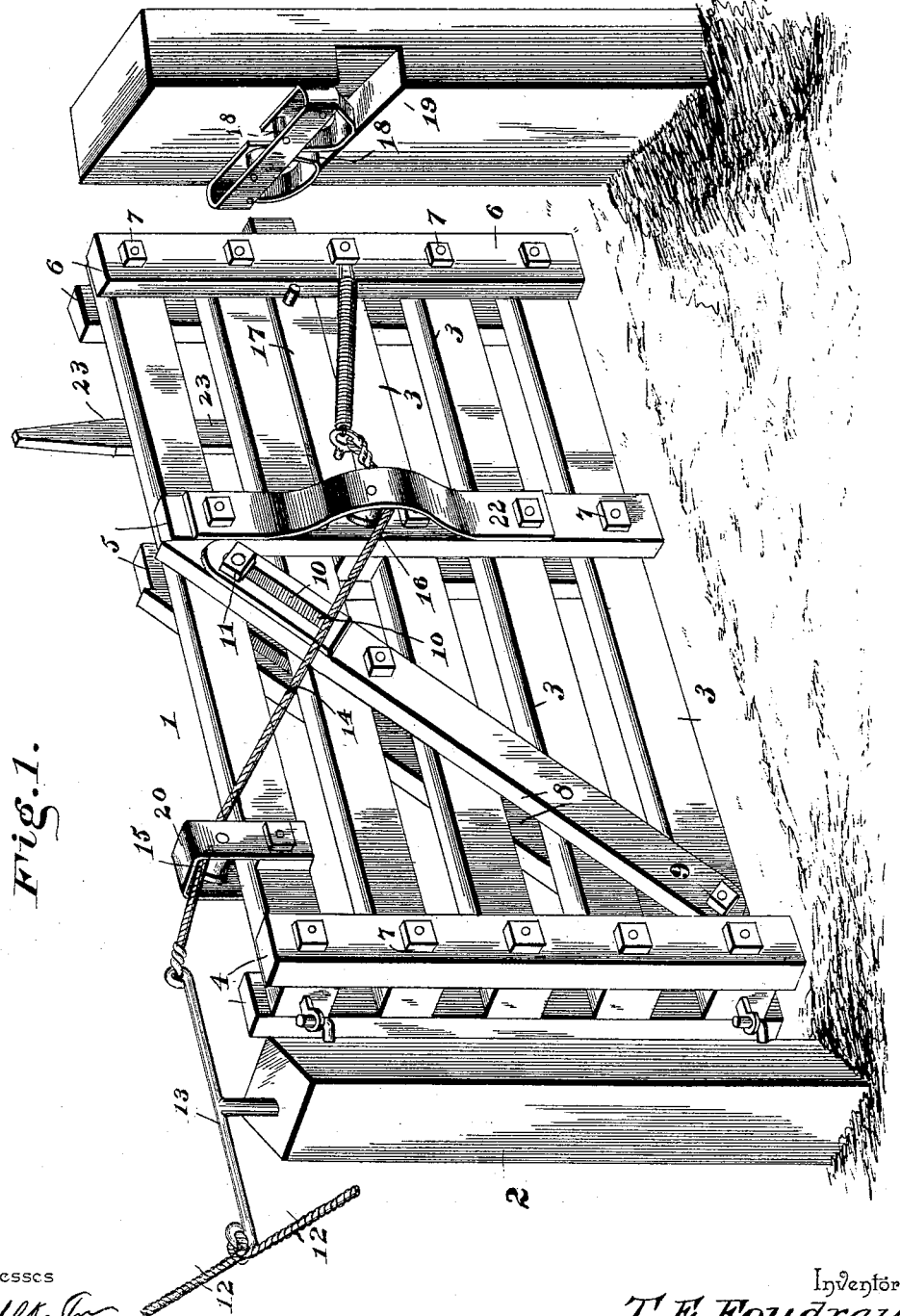
Figure 2:
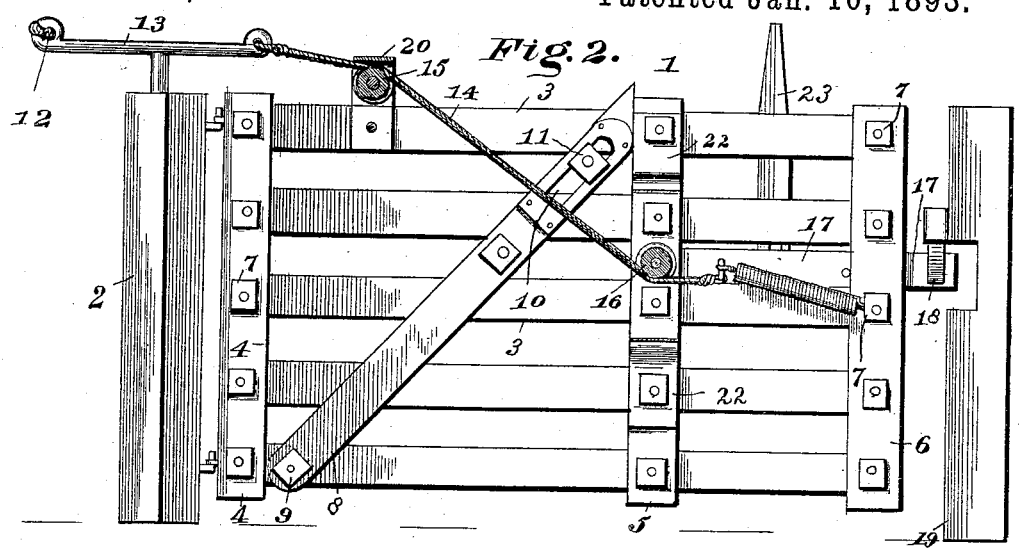
Figure 3:
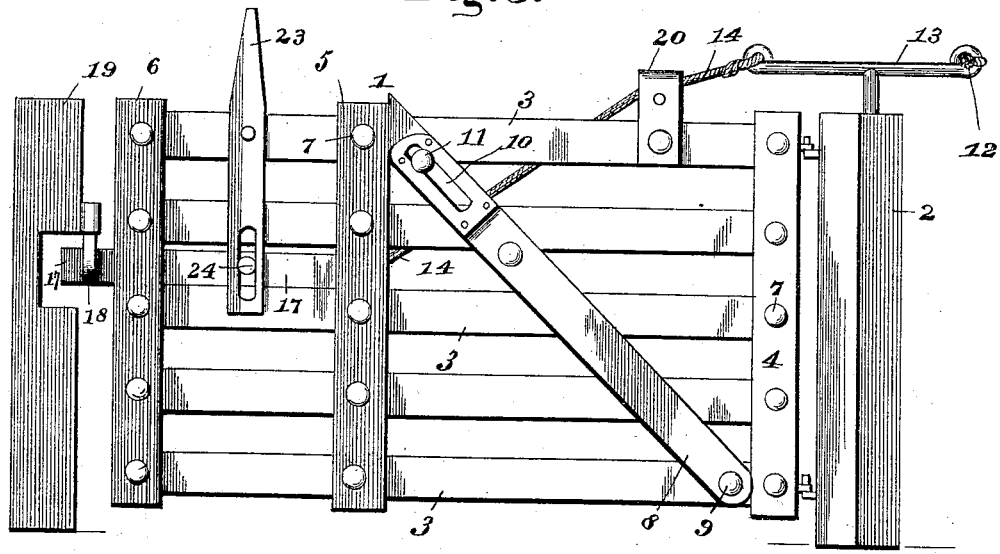

In the drawings—Figure 1 is a perspective view of a gate constructed in accordance with this invention. Fig. 2 is an elevation partly in section. Fig. 3 is an elevation showing the other side of the gate.

Like numerals of reference indicate corresponding parts in all the figures of the drawings.

1 designates a swinging gate hinged to a post 2 and composed of horizontal rails 3 and vertical end and central bars 4, 5 and 6 arranged in pairs on opposite sides of the horizontal rails, and secured to them by bolts 7, which pivotally connect the parts and enable the gate to be elevated for the purpose of counteracting sagging or permitting the gate to pass freely over uneven surfaces caused by snow drifts and the like, and also to permit the gate to be elevated for the separation of animals, by affording a passage for small animals, and excluding the larger ones.

The gate is secured in its adjustment by inclined adjustable bracing bars 8, arranged on opposite sides of the gate and pivoted at the bottom thereof near the hinged end by a bolt 9, and provided at their upper ends, which are beveled and which bear against the central bars 5, with slots 10 which register, and which receive a bolt 11.

The gate is opened and closed by operating ropes 12 extending from opposite sides of the gate to suitable distances therefrom, and having their inner ends attached to the rear end of a lever 13 which is fulcrumed on the hinge post 2, and which has its front end connected with the latch rope 14. The latch rope 14 extends over a pulley 15 mounted on the top of the gate, and downward under a pulley 16 arranged on one side of the gate, and thence to a latch-bar 17, which is normally held extended and in engagement when the gate is closed with the latch 18 of a latch post 19. When the lever is turned by one of the operating ropes the latch-bar is first withdrawn, and then a further turning causes the gate to swing on its hinges and to open. After passing through the gate, the other operating rope is pulled to close the gate. The pulley 15 is mounted in the hanger or bracket 20; and the pulley 16 is mounted on one side of the gate between the same and a bracket plate 22.

The gate is opened by hand by means of a vertically disposed lever 23, which is fulcrumed on the gate and is provided at its lower end with a longitudinal slot in which is arranged a screw 24 secured to the latch bar. The upper end of the lever 23 is shaped into a handle.

It will be seen that the gate is simple and inexpensive in construction; that it may be readily adjusted to counteract sagging, and that it is easily operated.

What I claim is—

The combination of a hinge post, a gate hinged to the same and provided on its top with a pulley and having a pulley mounted on one of its sides, a spring actuated latch bar mounted on the gate, a lever fulcrumed on the top of the hinge post, a latch rope passing around said pulleys and having one end attached to the latch bar and its other end connected to the lever, and operating ropes connected with the lever, substantially as described.

In testimony that I claim the foregoing as my own I have hereto affixed my signature in the presence of two witnesses.

THOMAS E. FOUDRAY.

Witnesses:
S. W. VAUGHN,
B. SHOBE.